United States Patent

[11] 3,597,934

[72] Inventors Harold Willids Andersen
 Oyster Bay;
 Harold W. Andersen, Laurel Hollow;
 Charles H. Harrison, Oyster Bay, all of, N.Y.
[21] Appl. No. 857,803
[22] Filed Sept. 15, 1969
[45] Patented Aug. 10, 1971
[73] Assignee H. W. Andersen Products, Inc.
 Oyster Bay, N.Y.
 Continuation-in-part of application Ser. No. 561,777, June 30, 1966, now Patent No. 3,516,223.

[54] METHOD AND APPARATUS FOR SUPPLYING MEASURED QUANTITIES OF A VOLATILE FLUID
7 Claims, 3 Drawing Figs.
[52] U.S. Cl. .................................................. 62/52, 21/58, 21/91, 21/108
[51] Int. Cl. ................................................... F17c 7/02
[50] Field of Search ........................................ 62/52; 21/58, 91, 106—108

[56] References Cited
UNITED STATES PATENTS
| | | | |
|---|---|---|---|
| 1,752,165 | 3/1930 | Ford | 62/52 X |
| 1,752,166 | 3/1930 | Ford | 62/52 |
| 2,377,342 | 6/1945 | Holicer | 62/52 |
| 3,013,573 | 12/1961 | Leuthner | 137/113 |
| 3,054,270 | 9/1962 | Huston | 21/58 X |
| 3,088,179 | 5/1963 | Leuthner | 21/58 X |
| 3,489,505 | 1/1970 | Schumann et al. | 21/58 X |

Primary Examiner—Albert W. Davis, Jr.
Attorney—Frank J. Jordan

ABSTRACT: The method and apparatus for controlling the delivery from a source of supply to a point of utilization of accurately measured quantities of volatile fluids, supplied as liquids and delivered as gases wherein a liquid under pressure is fed to a chamber where it remains a liquid under lower pressure and thence to an expansion chamber where the liquid is completely evaporated and maintained as a gas under relatively uniform constant pressure, and from which chamber the gas is delivered in measured quantities as required; heat being supplied to said expansion chamber to ensure evaporation of the liquid and to replace the heat lost through delivery of the gas.

Patented Aug. 10, 1971 3,597,934

INVENTORS
HAROLD WILLIDS ANDERSEN
HAROLD W. ANDERSEN
BY CHARLES H. HARRISON

Nolte and Nolte
ATTORNEYS

METHOD AND APPARATUS FOR SUPPLYING MEASURED QUANTITIES OF A VOLATILE FLUID

This application is a continuation-in-part of copending application Ser. No. 561,777, now U.S. Pat. No. 3,516,223 issued June 23, 1970 being directed to specific improvements in the sterilant supply system applicable to the apparatus disclosed in said application, as well as for other comparable purposes.

The measurement, packaging, and dividing into uniform doses of fluid materials having low boiling points present great difficulties, due largely to the unlimited expansibility of gases and the important interdependent effects of changes in temperature, pressure and volume. It is an object of the present invention to utilize such phenomena in obtaining extremely accurate control of a volatile substance such as a sterilant, whereby it can be fed in accurately measured quantities to containers or packages wherein it can be sealed in order to effect sterilization of medical, surgical and other products, instruments, tools, materials, apparatus and the like.

This invention relates specifically to methods of controlling the sterilant delivery to the packages sterilized on the machine disclosed in copending application Ser. No. 561,777 now U.S. Pat. No. 3,516,223. The problem is one of controlling the amount of the sterilant gas (ethylene oxide, or mixtures thereof, for example) delivered to each package which is processed through the system of said application. After each package, pouch or bag is placed over the torpedo or connecting means, the excess air is withdrawn from the bag by an external vacuum system. When the air is withdrawn, the vacuum system is disconnected, and a measured amount of sterilant is injected into the bag—the correct amount varying with the contents, the size of the bag, and other sterilization parameters.

One method of controlling the amount of sterilant gas admitted to the container being sterilized, is to accurately regulate the pressure of the delivered gas and vary the time it is permitted to flow into the container. Experience has shown, for example, that a gas delivery pressure of approximately 20 pounds per inch gage will permit accurate delivery to the container being sterilized with injection times of 1 to 4 seconds for typical products to be sterilized. It is readily apparent to one skilled in the art that increased delivery pressures would mean shorter delivery times, and vice versa, for the same amount of gas delivered.

The control of the gas delivery pressure can conveniently be separated into two groups. One group is concerned with sterilants, whose physical parameters are such that the delivery pressure, or the self pressure of the liquid/gas at room temperature is below the necessary or desired delivery pressure for which the system is designed. For example, ethylene oxide has a vapor pressure of approximately 7 p.s.i.g. at room temperature. In order to raise the vapor-pressure to approximately 20 p.s.i.g., heat must be applied to the supply tank or container of the liquid/gas, to raise the temperature of the liquid to approximately 100° F. Each delivery of gas to a package withdraws the heat of evaporation of that amount of liquid evaporating within the sterilant supply container to supply the gas withdrawn. This heat must be replaced in order to maintain the temperature and thus pressure within the tank.

The method of supplying and controlling the required heat is the subject of contemporaneously filed application Ser. No. 857,802 filed Sept. 16, 1969.

The second group of sterilants, to the control of which the present application is directed, includes those which are normally in excess of the required delivery pressure when they are stored as a liquid in the commercial shipping containers. For example, a mixture of ethylene oxide and Freon, commercially known as 88-12, has a self-pressure of approximately 70 p.s.i.g. at room temperature. As this delivery pressure is considerably above that which is convenient to use, some method of safely and accurately reducing this pressure must be employed. Further, as this mixture exists as a liquid in the tank, and must be removed from the tank only as a liquid under pressure, some method is necessary to provide the heat of evaporation when the liquid is converted to a gas prior to being injected into the material to be sterilized, as in a machine of the type disclosed in application Ser. No. 561,777. Ethylene oxide and Freon are completely miscible as liquids. If the mixture is withdrawn from the tank as a liquid, the ratio of 88 percent Freon and 12 percent ethylene oxide will be maintained. This will not be true if the mixture is withdrawn directly from the commercial storage tank as a gas because of the difference in boiling points.

This invention further relates to the method of withdrawing liquids, for example a sterilant or mixtures of sterilants and inert ingredients, and effecting the conversion thereof from a liquid to a gas at a controlled pressure. It would be possible to utilize specially constructed regulating/pressure reducing valves to accomplish the pressure reduction and then supplying the heat of evaporation when the liquid is converted to a gas. It is doubtful, however, that this method would provide the close control of the delivery pressure deemed necessary for an accurate delivery of measured doses of sterilant gas or gas mixture to the material to be sterilized, and the cost of such regulators would be prohibitive.

Figure 1:
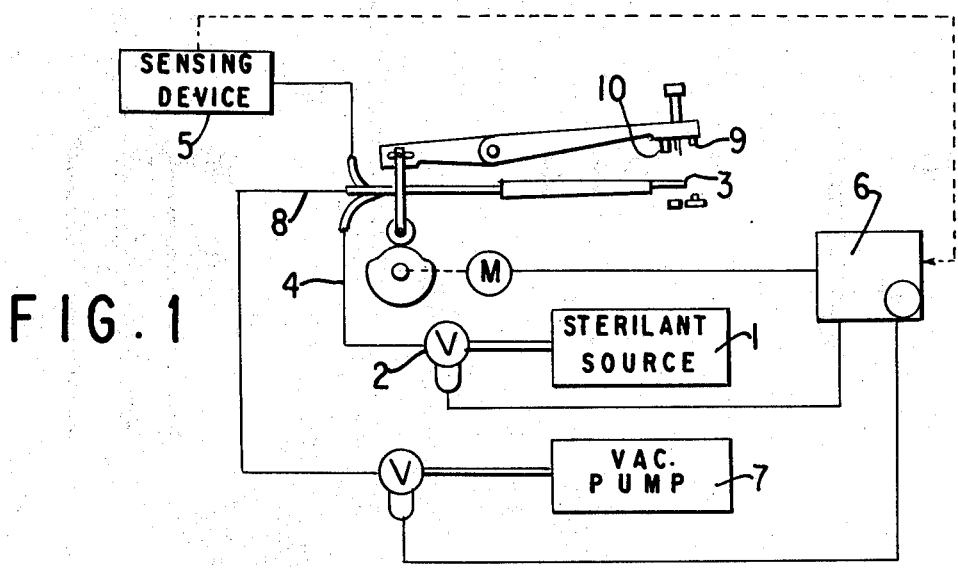
FIG. 1 is a schematic representation of the controls and other elements of an apparatus with which the present apparatus may suitably be associated, corresponding to FIG. 6 of application Ser. No. 561,777.

As indicated in FIG. 1, an article sterilizing system may include a sterilant source 1, a valve 2 controlling the release of sterilant therefrom, a torpedo 3 designed for introduction into a receptacle (not shown) for articles to be sterilized, a conduit 4 from valve 2 to torpedo 3 and adjustable automatic sensing and control devices 5, 6, with or without receptacle evacuating means 7, 8 and closing and sealing means 9, 10, all as more fully described in said copending application.

Figure 2:
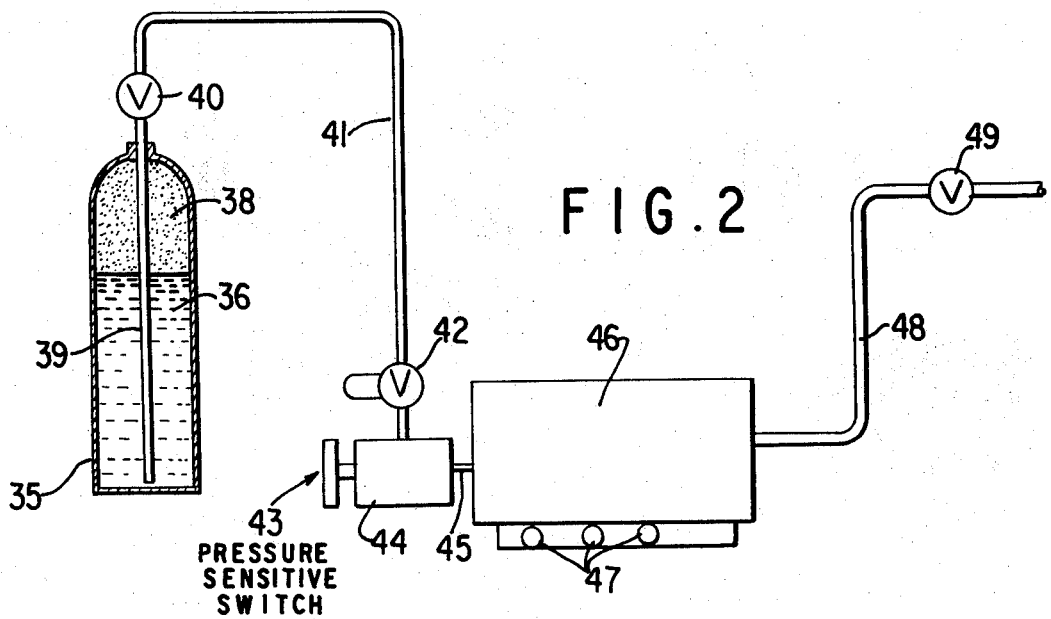
FIG. 2 represents somewhat diagrammatically, in elevation and partly in section, a form of the apparatus for handling high pressure liquids.
Figure 3:
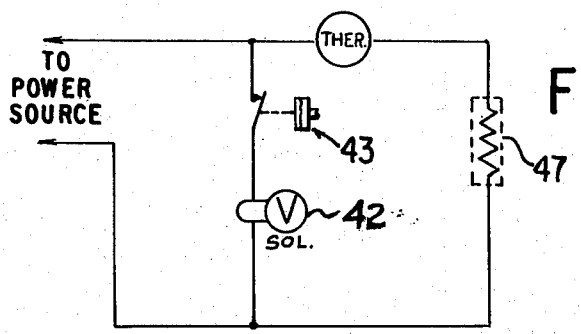
FIG. 3 is a wiring diagram for the apparatus of FIG. 2.

According to the present invention, provision is made for admitting a small quantity of liquid to a reservoir tank in a series of impulses. FIG. 2 shows a conventional commercially available storage tank 35 filled with a liquid 36 under pressure with a liquid/gas interface 37 and gas under pressure above the interface shown generally as 38. The tank is fitted with a delivery tube 39 whose opening is at the bottom of the tank so that when valve 40 is opened, the vapor pressure of the gas 38 above the interface forces the liquid through tube 39 into the connecting tube 41. Solenoid valve 42 is controlled by a pressure sensitive switch generally shown as 43. The solenoid valve 42, pressure sensing switch 43 and a chamber 44 of small volume, communicate through a small orifice 45 with the interior of expansion tank 46. When the pressure switch 43 senses that the pressure in expansion tank 46 is below the set point of the pressure switch 43, it energizes the solenoid valve 42, thus admitting high pressure liquid from the storage tank to the small volume chamber 44. The direct connection to the high pressure of the storage tank instantly activates the pressure sensing switch 43 and immediately closes the solenoid valve 42. This quick action, typically a few milliseconds, admits only a small volume of liquid to chamber 44, in the concept of a pulse. The high pressure liquid in chamber 44 flows into expansion tank 46 through restrictive orifice 45. The size of the orifice 45 and the pressure differential between chamber 44 and expansion tank 46 determine the time required for the pressure in chamber 44 to equilibrate with the pressure in expansion tank 46. When the pressure in chamber 44 again reaches the set point of the pressure sensing switch, another pulse of liquid is admitted to said chamber, and subsequently flows into expansion tank 46 thru orifice 45. It is obvious to one skilled in the art, that each pulse of liquid admitted to expansion tank 46 causes a marginal increase in the pressure inside tank 46. When the pressure in the tank 46 increases to the set point of the pressure switch 43, no further pulses of liquid will be admitted to chamber 44. However, if gas is withdrawn from expansion tank 46, the pressure in tank 46 will decrease. This decrease in pressure will be transmitted to pressure sensing switch 43 through orifice 45 and chamber 44. When the pressure decreases to the set point of the pressure sensing switch, it causes another pulse of liquid to be admitted to the expansion tank. By proper design of the relative volumes of the chamber 44, and expansion tank 46, and selection of the correct orifice size 45, the system can be made to control the pressure in the expansion tank very closely. For example, using a mixture of 12 percent ethylene oxide and 88 percent Freon, the pressure within the tank, and thus the delivery pressure to the point of use can be controlled within ±½ p.s.i.g.

One problem with conventional pressure sensing switches is the differential pressure between the turn on point, and the turnoff point. On commercially available switches, this differential may be as great as 20 percent of the set point pressure. The present method obviates this problem by sensing only the turn on point of the pressure sensing switch to trigger the liquid pulse. The immediate transmittal of high pressure from the storage tank far exceeds the differential pressure of the sensing switch.

The expansion tank 46 is fitted with thermostatically controlled heaters, shown generally at 47, to provide the heat of evaporation required to convert the liquid to a gas in the expansion tank 46. It is necessary to provide this additional heat to assure that all of the liquid will be evaporated to the gaseous state. This is particularly true where a mixture of liquids is used. For example, where 88–12 Freon/ethylene oxide mixture is used, if heat is not supplied to the expansion tank, it will self-cool due to the evaporation of the liquid mixture to the gaseous mixture. The Freon component will continue to evaporate and self-cool the tank, however, the ethylene oxide component will remain as a liquid in the tank, because its condensation point is above the temperature in the self-cooled tank.

Delivery to the point of use of the gas or gas mixture is achieved through conduit means 48 to valve 49 (indicated as valve 2, in FIG. 1). Valve 49 can conveniently be a solenoid valve controlled by an external timing mechanism, 5, 6 in FIG. 1. Accurate delivery of aliquots of gas or gas mixtures can be obtained by carefully controlling both the delivery pressure by the method described, and the time during which valve 49 delivers the gas to the point of utilization.

What we claim is:

1. Apparatus for converting a volatile liquid at a given pressure to a gas having a substantially lower pressure and for supplying measured quantities of said gas to a point of utilization comprising, means confining said liquid under pressure, container means including first and second chambers, conduit means for delivering said liquid intermittently to said first chamber, means operable in said conduit means to control the flow of liquid from said confining means to said first chamber in small intermittent doses in response to the lowering of the pressure in said first chamber to a set point, a restricted aperture providing continuous communication between said chambers and constituting means for passing measured quantities of said liquid to said second chamber, means for heating said second chamber to vaporize said liquid therein, means for maintaining the temperature of the gas formed by said vaporization at a predetermined level, and means for delivering measured quantities of said gas to a point of utilization.

2. Apparatus according to claim 1 wherein said operable means comprises a solenoid valve in said conduit means, and pressure sensing means controlling said solenoid valve as a function of changes of liquid pressure in said first chamber.

3. Apparatus according to claim 1 in which said second chamber is substantially larger than said first chamber.

4. Apparatus according to claim 1 in which said heating means has the capacity to supply more heat to the gas in the second chamber than can be removed by the delivery of gas therefrom.

5. Apparatus according to claim 1 wherein the restriction of said aperture is such as to cause a substantial pressure drop between said first and second chambers.

6. The method of supplying measured quantities of gas to a point of utilization which includes, providing a quantity of volatile liquid under pressure, providing container means having a first chamber and an expansion chamber connected by a restricted aperture, sensing the pressure of the liquid in said first chamber, feeding small doses of said liquid intermittently to said first chamber under reduced pressure in response to the lowering of the pressure in said first chamber to a set point permitting escape of said liquid continuously through said restricted aperture from said first chamber to said expansion chamber, supplying heat to said expansion chamber to ensure complete evaporation of said liquid to gas, and delivering measured quantities of said gas to a point of utilization.

7. The method according to claim 6 in which the interruption of said feeding is effected in response to increase of pressure in said first chamber.